J. P. SUMMERS.
Earth-Auger.

No. 167,628.

Patented Sept. 14, 1875.

Witnesses:

Inventor:
John P. Summers
A. H. Byers. Atty.

UNITED STATES PATENT OFFICE.

JOHN P. SUMMERS, OF TIFFIN, OHIO.

IMPROVEMENT IN EARTH-AUGERS.

Specification forming part of Letters Patent No. 167,628, dated September 14, 1875; application filed August 13, 1875.

*To all whom it may concern:*

Figure 1:
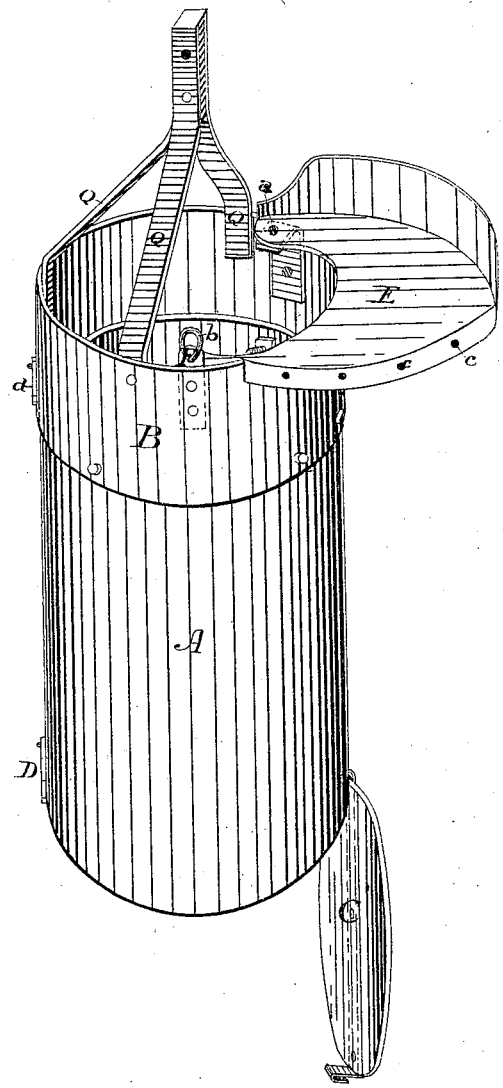

Be it known that I, JOHN P. SUMMERS, of Tiffin, State of Ohio, have invented an Improvement in Earth-Augers, of which the following is a specification:

The object of my invention is to enlarge holes made by earth-augers, for wells or other purposes, to any size, commencing with a hole the size of the cylinders A and B, and making it any size required, by the arrangement of two cylinders A and B, a movable bit, reamer, and conveyer, E, pin $b$, pivot $d$, any number of holes, $c$, and movable bottom C, as shown in the perspective view, Fig. 1, of the accompanying drawing.

Figure 2:
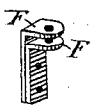

In the perspective view, Fig. 1, A and B represent two cylinders. The upper and shorter one, B, fits over the top of the lower and longer one, A, and is bolted to the same, the nuts of these bolts being on the inside of the cylinder. To the upper cylinder B I attach the movable steel bit, reamer, and conveyer E, the heel end being attached by a hinge or pivot, $d$, which is bolted to the inner and upper side of the cylinder B. The front or toe end passes through the lips F F. (Shown more plainly in Fig. 2.) A hole is made through these two lips to admit of the pin $b$ in a perpendicular direction. The cutting or toe end of the movable bit, reamer, and conveyer E is made on a curve, the radius of which is a little more than the distance from the pivot $d$ to the holes through the lips F F, and at short distances from each other, so that the bit, reamer, and conveyer E can be moved in or out, and can be held in place by the pin $b$ passing down through the holes in the lips F F, and the holes $c$ in the bit, reamer, and conveyer E. The outside of this movable bit, reamer, and conveyer E is bent up at right angles with the bottom, which is made flat, and curves back, so that when the reamer is turned into the cylinder B the outside will coincide with the outside of the cylinder. The inside edge of the bottom is also made on a curve, which coincides with the inside of the cylinder when it is turned out to its greatest cutting power, except where it connects with the pivot $d$ and the lips F F, where it turns into the cylinder, in order to make a stronger connection. The cutting end of the bottom and side is made sharp, and is lower than the heel end, a cut being made in the upper part of cylinder B to admit the same. The movable bottom C is made circular and flat to fit the bottom of cylinder A, and is attached by a hinge on one side and a hook on the opposite side to the bottom of the cylinder. The two cylinders A and B, used together, make a large bucket to hold the cuttings made by the bit, reamer, and conveyer E, and are used together until the bottom of the well or hole is reached by the lower cylinder A, when it is detached by removing the bolts which fasten it to cylinder B, and the bottom C is taken off and fastened to the bottom of cylinder B, where it is attached in the same manner as it was to cylinder A. Q Q Q are braces, which are firmly riveted to cylinder B, to which the motive-power is applied.

The operation of my invention is as follows: A hole is first bored in the ground the size of the cylinders, by any earth-auger, or other machine. The movable bit, reamer, and conveyer E is turned in and fastened to the lips F F by means of the pin $b$, so that it will cut the size of hole required. The bottom C is shut and fastened by means of the hook D. The cylinders are then set in motion, the cutting-edge of the bit, reamer, and conveyer is forced into the ground around the cylinders, and it, being lower than the heel end, forces the cylinder down, cutting and throwing the earth directly into the cylinders until they are full. They are then raised and emptied by unfastening the hook D, which allows the bottom to swing down completely out of the way of the contents of the cylinder. The operation is then repeated until the hole is as deep as the lower cylinder will allow. When that is detached, as hereinbefore described, and the bottom fastened to the upper cylinder, the hole is then finished to the bottom. In this manner any size of hole can be made by moving the bit, reamer, and conveyer to the required place. The cutting part of the movable bit, reamer, and conveyer E being on a curve, the dirt, &c., is shaved off, making the operation much easier than the knives and reamers now in use.

I claim—

1. The movable bit, reamer, and conveyer

E, with any number of holes c, attached to the cylinder at one end by a pivot or hinge, d, and at the other end by a pin, b, and lips F F, as herein set forth and described.

2. The movable flat bottom C, attached to the cylinder by a hinge on one side and a hook on the opposite side, as herein shown and described.

3. Two cylinders A and B, attached together by means of bolts, which can be used together or separately, in connection with the flat bottom C.

4. The combination of the movable bit, reamer, and conveyer E, pivot d, pin b, two lips, F F, any number of holes c, cylinders A and B, movable flat bottom C, attached by a hinge and hook, with braces Q Q Q, substantially as herein set forth and specified.

JOHN P. SUMMERS.

Witnesses:
J. S. BYERS,
GEO. D. LOOMIS.